(12) United States Patent
Anthony

(10) Patent No.: US 6,698,420 B2
(45) Date of Patent: Mar. 2, 2004

(54) COOKING POT APPARATUS WITH POT LID HAVING HEAT EXCHANGE MEANS FOR CONTAINING FOOD AROMAS

(76) Inventor: Michael M. Anthony, 10189 W. Sample Rd., Coral Springs, FL (US) 33065

(*) Notice: Subject to any disclaimer, the term of this patent is extended or adjusted under 35 U.S.C. 154(b) by 68 days.

(21) Appl. No.: 09/939,923

(22) Filed: Aug. 27, 2001

(65) Prior Publication Data

US 2002/0040711 A1 Apr. 11, 2002

Related U.S. Application Data

(63) Continuation-in-part of application No. 09/411,713, filed on Oct. 4, 1999, now Pat. No. 6,279,568.

(51) Int. Cl.[7] ............................................. A47J 27/00
(52) U.S. Cl. ..................... 126/381.1; 126/384.1; 126/374.1; 99/347; 220/203.01; 220/521
(58) Field of Search ....................... 126/381.1, 384.1, 126/382.1, 383.1, 376.1, 377.1; 99/293, 294, 347, 345; 220/203.01, 521, 202

(56) References Cited

U.S. PATENT DOCUMENTS

| | | | | |
|---|---|---|---|---|
| 1,417,243 A | * | 5/1922 | Graves | ........................ 99/293 |
| 2,517,167 A | * | 8/1950 | Bemis | ........................ 99/345 |
| 2,527,395 A | * | 10/1950 | Burditt | ........................ 99/347 |
| 2,636,636 A | * | 4/1953 | Smith | ...................... 126/384.1 |
| 3,085,498 A | * | 4/1963 | Falla | ...................... 126/382.1 |
| 3,209,746 A | * | 10/1965 | Giuseppe | .................. 126/381.1 |
| 4,322,954 A | * | 4/1982 | Sheehan et al. | ............... 62/371 |
| 4,700,689 A | * | 10/1987 | Speker | ..................... 126/381.1 |

FOREIGN PATENT DOCUMENTS

| | | | | |
|---|---|---|---|---|
| DE | 100 31 167 A1 | * | 1/2002 | ............. A47J/27/00 |
| JP | 4-5919 A | * | 1/1992 | ............. A47J/27/00 |
| JP | 2002-65458 A | * | 3/2002 | ............. A47J/27/00 |

* cited by examiner

Primary Examiner—Josiah Cocks
(74) Attorney, Agent, or Firm—Oltman, Flynn & Kubler

(57) ABSTRACT

A cooking pot apparatus includes a cooking pot having a pot rim and a pot lid assembly for rapidly dissipating heat within the cooking pot, the pot lid assembly being sealingly and lockingly secured to the pot rim and extending across the pot rim, the pot lid assembly including a coolant compartment extending across the pot rim for retaining a quantity of heat absorbing coolant. The pot lid assembly preferably additionally includes a pot safety valve assembly.

15 Claims, 16 Drawing Sheets

COOKING POT APPARATUS WITH POT LID HAVING HEAT EXCHANGE MEANS FOR CONTAINING FOOD AROMAS

FILING HISTORY

This application is a continuation-in-part of application Ser. No. 09/411,713 filed on Oct. 4, 1999. Now U.S. Pat. No. 6,279,568.

BACKGROUND OF THE INVENTION

1. Field of the Invention

The present invention relates generally to the field of food preparation equipment. More specifically the present invention relates to a cooking pot apparatus having a pot rim and a pot lid assembly sealingly and lockingly secured to the pot rim with lid assembly locking means, the pot lid assembly including an inventive coolant compartment extending across the top of the pot and containing any of various coolants, and including a pot safety valve assembly. The coolant compartment and retained coolant condense vapors of heated food and superheated steam along the lid assembly lower surface so that the vapors fall back into the food or into a containment structure. As a result, these vapors do not contaminate the air of a user household, and their condensate enhances the flavor of the food. The coolant compartment may be open or the coolant compartment may be closed. In the event that the coolant compartment is closed, the pressure of the coolant is regulated with a compartment safety valve assembly. In the event that the coolant compartment is open, an aroma generating substance is optionally added to the coolant so that the user household is filled with a pleasing fragrance as the coolant heats and evaporates by absorbing the heat from the superheated steam in the food cooking chamber. The coolant may be water, a wax composition, an oil composition, or an ice pack in the form of an envelope filled with water which is frozen by the user prior to insertion into the coolant compartment. Use of other coolants is contemplated.

The lid assembly includes a closure wall for fitting entirely across and closing the pot rim, having rim locking means at the closure wall periphery. At least a portion of, and preferably all of the closure wall functions as the coolant compartment bottom wall. A circumferential coolant compartment side wall is sealingly joined to and extends upwardly from the compartment bottom wall to a compartment side wall upper end. When the coolant compartment is sealed, a coolant compartment top wall extends across and sealingly meets the compartment side wall upper end, so that the compartment is closed.

2. Description of the Prior Art

There have long been cooking pots including pressure cookers for cooking various foods. A problem with these prior cooking pots has been that they release food vapors into the surrounding atmosphere which may be unwanted by the home or business owner and which can linger and permeate porous surfaces.

It is thus an object of the present invention to provide a cooking pot apparatus having an inventive pot lid which seals the cooking pot and does not have to release food vapors into the surrounding air because it absorbs and transfers away sufficient quantities of heat from the interior of the cooking pot to prevent pot internal pressure levels from exceeding the safe containment level of the cooking pot and lid. Thus, while this discloses a means of preventing the aromas of cooking from contaminating a cooking environment, it inventively discloses a means of removing heat from the cooking compartment without the build up of excessive pressure therein.

It is another object of the present invention to provide such a cooking pot apparatus which can release selected, pleasant aromas into the air in place of food vapors.

It is still another object of the present invention to provide such a cooking pot apparatus in which the lid assembly contains a coolant which for some embodiments can be frozen in advance of cooking and placed into the lid assembly to more efficiently absorb heat.

It is finally an object of the present invention to provide such a cooking pot apparatus or separate cooking pot lid assembly which is safe, reliable and relatively inexpensive to manufacture.

SUMMARY OF THE INVENTION

The present invention accomplishes the above-stated objectives, as well as others, as may be determined by a fair reading and interpretation of the entire specification.

A cooking pot apparatus is provided, including a cooking pot having a pot rim and a pot lid assembly for rapidly dissipating heat within the cooking pot, the pot lid assembly being sealingly and lockingly secured to the pot rim and extending across the pot rim, the pot lid assembly including a coolant compartment extending across the pot rim for retaining a quantity of heat absorbing coolant.

The pot lid assembly preferably additionally includes a pot safety pressure valve assembly. The pot lid assembly preferably includes a closure wall for fitting across the pot rim and closing the pot, the closure wall having a closure wall sealing element for creating the seal between the closure wall and the pot rim, and having a releasible rim locking mechanism for locking the closure wall to the pot rim. At least a portion of the closure wall preferably is a coolant compartment bottom wall, and the coolant compartment preferably includes the compartment bottom wall, a circumferential compartment side wall having a compartment side wall upper end and being sealingly joined to and extending upwardly from the compartment bottom wall, and a compartment top wall spaced above the compartment bottom wall and joined to and extending across the compartment side wall.

The coolant compartment top wall optionally makes sealing contact with the compartment side wall, so that the compartment is sealed. Alternatively, the coolant compartment top wall has at least one opening placing the interior of the coolant compartment in fluid communication with the atmosphere surrounding the coolant compartment.

The pot safety valve assembly preferably includes a substantially upright venting tube having a tube lower end opening through the closure wall and extending through the coolant compartment and having a tube upper end opening through and extending above the compartment top wall; and a weighted valve cap resting and cooling on the pot venting tube upper end.

The compartment top wall has a top wall upper surface and the compartment top wall optionally includes a coolant guide structure affixed to the top wall upper surface for guiding liquid coolant into the coolant compartment and for guiding vaporized coolant out of the coolant compartment. The coolant guide structure preferably includes a guide side wall forming a laterally closed coolant retaining tray encompassing the pot safety valve assembly, the coolant retaining tray being divided into a coolant receiving region and a coolant discharge region by a tray partition wall; and a coolant entry port in the compartment top wall within the coolant receiving region and a coolant exit port in the compartment top wall within the coolant discharge region.

The cooking pot apparatus preferably additionally includes a retaining tray cover removably fitted over the coolant retaining tray and the segment of the guide side wall extending around the coolant receiving region preferably includes an outward radial jog forming a coolant receiving channel protruding laterally beyond the retaining tray cover so that liquid coolant can be poured into the coolant receiving region without removing the tray cover, the coolant receiving channel opening into and being in fluid communication with the remainder of the coolant receiving region.

The cooking pot apparatus preferably additionally includes a floating indicator buoy slidably fitted within the coolant entry port, and having a buoy marked side surface indicating the elevation of the indicator buoy is relative to the coolant entry port as the indicator buoy floats in coolant within the compartment, so that a user can see whether more coolant is required within the coolant compartment. The buoy also could be elevated by the pressure of the evaporating coolant from the coolant chamber thus indicating the presence of coolant within the coolant chamber. The cooking pot apparatus preferably still additionally includes a coolant escape tube encircling the coolant exit port and extending above the compartment top wall to a point spaced below the retaining tray cover, the coolant escape tube containing any splashes of liquid coolant within the compartment so that splashing coolant falls back into the compartment, and permitting only vaporized coolant to pass out of the compartment into the coolant guide structure. The cooking pot apparatus preferably yet additionally includes a pot lid handle secured to the lid assembly. The areas of the coolant discharge region surrounding the coolant escape tube optionally include aroma retaining areas for retaining aroma crystals to be vaporized and carried into the atmosphere surrounding the apparatus by vaporized coolant. The lid assembly optionally includes a condensate collection tray having a collection tray bottom wall, an outer collection tray side wall, connection structure attaching the collection tray to the lower surface of the closure wall, for collecting food and water condensate forming on and dripping from the lower surface of the closure wall.

The compartment top wall preferably includes a valve port into which is fitted a compartment safety valve assembly sealed to the compartment top wall with a valve assembly sealing element and having a substantially upright pressure release passageway, the pressure release passageway being releasibly closed at its upper end by a closure valve weight cap fitting sealingly over the passageway.

The coolant compartment preferably contains air as a coolant and the compartment top wall preferably includes at least one air intake port and at least one air release port, and a fan assembly mounted to the compartment top wall within the coolant compartment underneath the at least one air release port for drawing air into the coolant compartment through the at least one air intake port and for driving air out of the coolant compartment through the at least one air release port, so that air entering the coolant compartment absorbs heat from the compartment bottom wall and carries the heat with it as the air exits the coolant compartment. The at least one air intake port optionally is located along the periphery of the compartment, and the at least one air release port substantially at the center area of the compartment top wall.

The coolant compartment preferably contains a vacuum and a quantity of liquid coolant. The closure wall preferably rises progressively toward its center in a series of annular steps, and the compartment top wall has a progressive concave curvature upward toward its center, for enhancing compartment strength against collapse from ambient pressure when not in use and against outward deformation when the coolant is heated and exerts pressure above ambient.

The coolant compartment optionally includes a compartment opening structure for insertion of a quantity of coolant which is pre-cooled prior to insertion into the coolant compartment for increasing the capacity of the coolant to absorb heat. The coolant package preferably includes an envelope containing a coolant.

A pot lid assembly is further provided for rapidly dissipating heat within a cooking pot, including a cooking pot having a pot rim, the pot lid assembly including a closure wall for fitting across the pot rim and closing the pot, the closure wall having a closure wall sealing element for creating the seal between the closure wall and the pot rim, and having a releasible rim locking mechanism for coolant locking the closure wall to the pot rim; a coolant compartment extending from the closure wall for retaining a heat absorbing coolant.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
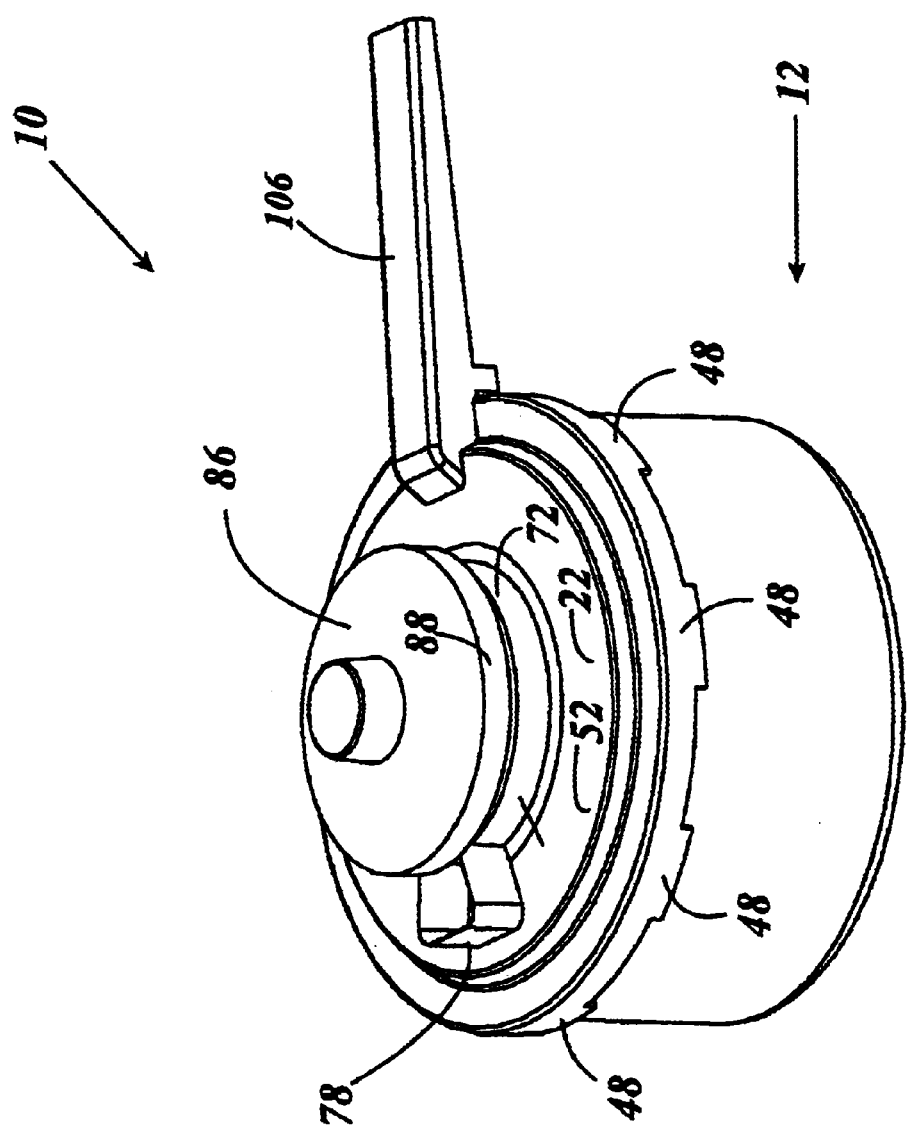
FIG. 1 is a perspective view of the first embodiment of the cooking pot apparatus including the inventive pot lid assembly.
Figure 2:
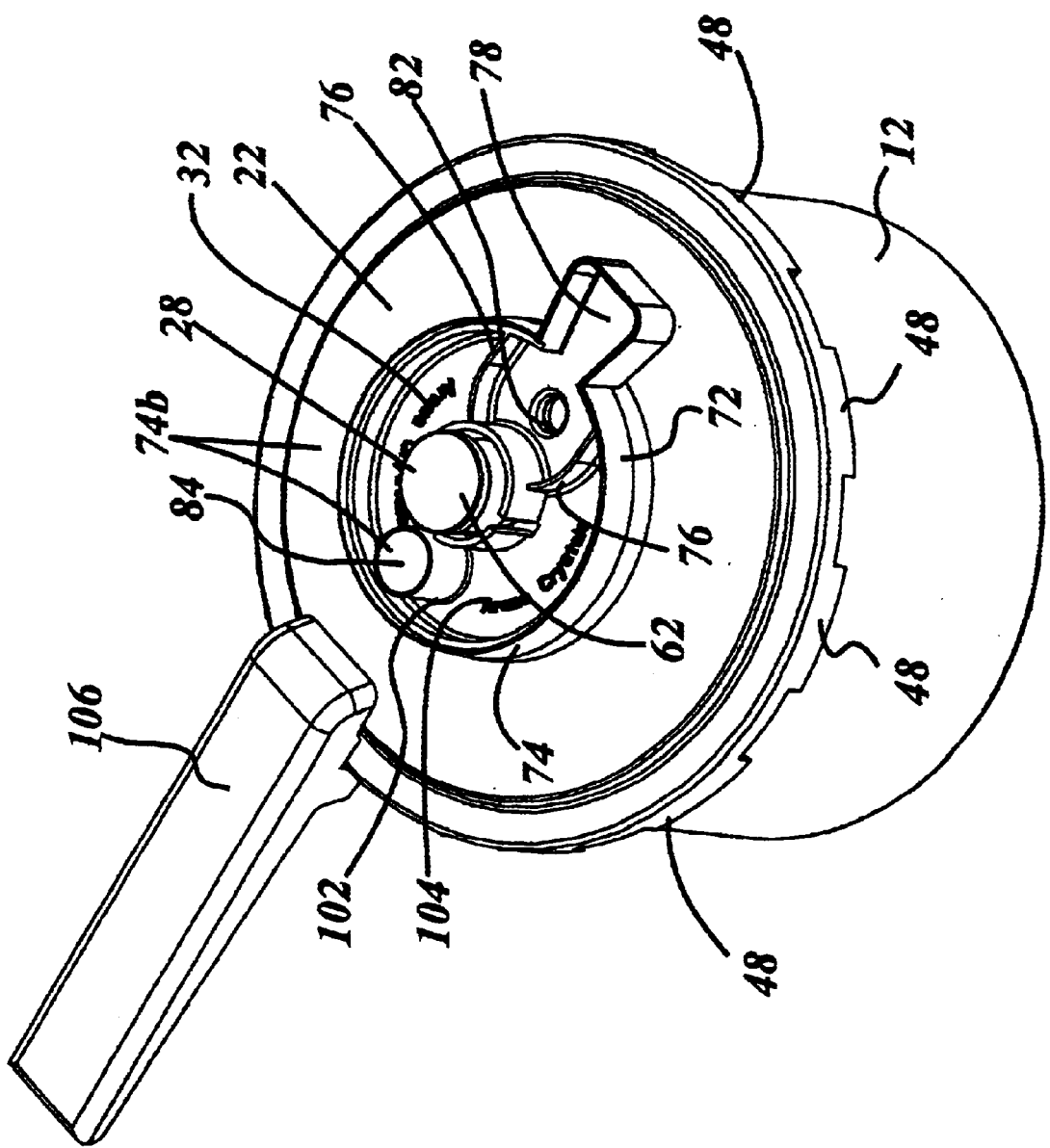
FIG. 2 is an upper perspective view of the apparatus of FIG. 1 with the cover removed, revealing the various details of the coolant guide structure and location of the indicator buoy and pot valve assembly.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

The Invention Generally

Referring to FIGS. 1–16, a pressurized cooking pot apparatus 10 is disclosed including a cooking pot 12 having a pot rim 14 and a heat dissipating pot lid assembly 20 sealingly and lockingly secured to pot rim 14. The pot lid assembly 20 includes a coolant compartment 22 extending across the top of the pot 12 and retaining any of various coolants 24. The lid assembly 20 preferably also includes a pot safety valve assembly 26. As the food and water in the cooking pot 12 evaporate, pressure is built up within the cooking pot 12 so that the temperature of the boiled vapors is far above the normal boiling point of the coolant 24 in coolant compartment 22. This permits the temperature of the lid assembly 20 lower surface to be able to transmit heat from the steam to the coolant 24 and thus boil coolant 24. It is important that coolant 24 has a boiling point that is at least 3 degrees lower than the temperature of the superheated vapors within the cooking pot 12. The coolant compartment 22 and retained coolant 24, condense vapors of heated food and superheated vapors along the lid assembly 20 lower surface so that the condensed vapors fall back into the food or into a containment structure (described in paragraphs which follow). As a result, these vapors do not contaminate the air of a user household, and their condensate enhances the flavor of the food. Advantageously, apparatus 10 discloses a means of lowering the pressure of a pressure cooking pot 12 without the loss of cooking vapors from the interior of the cooking pot 12. The pressure of the cooking pot 12 could then be accurately regulated by choosing the boiling point of the coolant 24.

Although lid assembly 20 lower surface is a heat transfer surface, it is not important that it be constructed from thin wall materials or from highly conductive materials, since it is the temperature difference between the boiled vapors and the coolant 24 that facilitates the heat transfer process. Thus advantageously, stainless steel, aluminum or other types of metals may be used without any limitations. For example a heavy gauge metal would simply absorb heat from the steam and vapors until it reaches the boiling temperature of coolant 24.

The coolant compartment 22 may be open or the coolant compartment 22 may be closed. In the event that the coolant compartment 22 is closed, the pressure of the coolant 24 is regulated with a separate compartment safety valve assembly 28. In the case when it is closed, and pressure were to build up within coolant compartment 22, the pressure within cooking pot 12 will be slightly higher than the pressure within coolant compartment 22, so that again coolant 24 will boil away as described above and break the compartment safety valve assembly 28. In the event that the coolant compartment 22 is open, pressure builds up within cooking pot 12 so the cooking vapors will maintain a temperature above the boiling point of coolant 24, and coolant 24 will boil away as and break compartment safety valve assembly 28. An aroma generating substance 32 is optionally added to the coolant 24 so that the user household is filled with a pleasing fragrance as the coolant 24 heats and evaporates. The coolant 24 may be water, a wax composition, an oil composition, or an ice pack in the form of an envelope filled with water which is frozen by the user in his or her home refrigerator prior to insertion into the coolant compartment. Use of other coolants 24 is contemplated.

The lid assembly 20 includes a closure wall 42 for fitting entirely across and closing the pot rim 14, having rim locking means 16 at the closure wall 42 periphery. At least a portion of, and preferably all of the closure wall 42 functions as the coolant compartment bottom wall 44. A circumferential coolant compartment side wall 46 is sealingly joined to and extends upwardly from the compartment bottom wall 44 to a compartment side wall upper end 46a. Where the coolant compartment 22 is closed, a coolant compartment top wall 52 extends across and sealingly meets the compartment side wall upper end 46a, so that the compartment 22 is sealed. Where the coolant compartment 22 is open, the coolant compartment top wall 52 has ports placing the interior of compartment 22 in fluid communication with the atmosphere.

The pot safety valve assembly 26 preferably includes a vertically oriented venting tube 56 which opens at its lower end through the closure wall 42, extends through the coolant compartment 22 and upwardly through the compartment top wall 52. A pot safety valve is provided at the pot venting tube 56 upper end, which preferably takes the form of a weighted valve cap 62 resting loosely on the pot venting tube 56 upper end, this weighted cap 62 being of the type found on many prior art pressure cooker pots.

First Preferred Embodiment

The first embodiment of apparatus 10 provides a lid assembly 20 with an open cooling compartment 22 in which the compartment top wall 52 releasibly and sealingly locks onto the compartment side wall 46 with radial locking tabs 54 and hook-shaped engagement flanges 48 of the type found on conventional pressure cooker lids. Compartment top wall 52 has a coolant guide structure 70 affixed to the upper surface of compartment top wall 52. See FIGS. 1–9. The coolant guide structure 70 includes a guide side wall 72 forming a closed loop coolant retaining tray 74 containing the pot venting tube 56, the coolant retaining tray 74 being divided into a coolant receiving region 74a and a coolant discharge region 74b by a tray partition wall 76. A coolant entry port 82 is provided in compartment top wall 52 within coolant receiving region 74a and a coolant exit port 84 is provided in compartment top wall 52 within coolant discharge region 74b. A transparent retaining tray cover 86 removably fits over the top of coolant retaining tray 74, having a downwardly extending peripheral flange 88 which fits closely inside guide side wall 72.

The portion of the guide side wall 72 extending around the coolant receiving region 74a preferably includes a radial jog forming a coolant receiving channel 78 protruding laterally beyond retaining tray cover 86 so that liquid coolant 24 can be poured into the coolant receiving region 74a without removing tray cover 86. Coolant receiving channel 78 opens into and is in fluid communication with the remainder of coolant receiving region 74a. A floating indicator buoy 92 is loosely and removably fitted within coolant entry port 82. Indicator buoy 92 has a stepped and colored-banded side surface indicating the level at which indicator buoy 92 is floating within the coolant entry port 82, so that a user simply can look through the transparent retaining tray cover 86 and see whether more coolant 24 needs to be added to coolant compartment 22. As long as coolant 24 remains within compartment 22, the pressure within cooking pot 12 does not become sufficiently high to cause pot safety valve assembly 26 to open.

A coolant escape tube 102 preferably encircles coolant exit port 84 and rises above compartment top wall 52 to a point spaced below retaining tray cover 86, so that splashes of coolant 24 within compartment 22 are contained and fall back into compartment 22, and only vaporized coolant 24 passes out of compartment 22 into coolant guide structure 70. The areas of coolant discharge region 74b surrounding coolant escape tube 102 function as aroma retaining areas 104, into which aroma crystals are optionally placed to be dissolved and carried into the atmosphere around the apparatus 10 by hot vaporized coolant 24. A pot lid handle 106 of conventional construction is secured to and extends radially from lid assembly 20.

Figure 3:
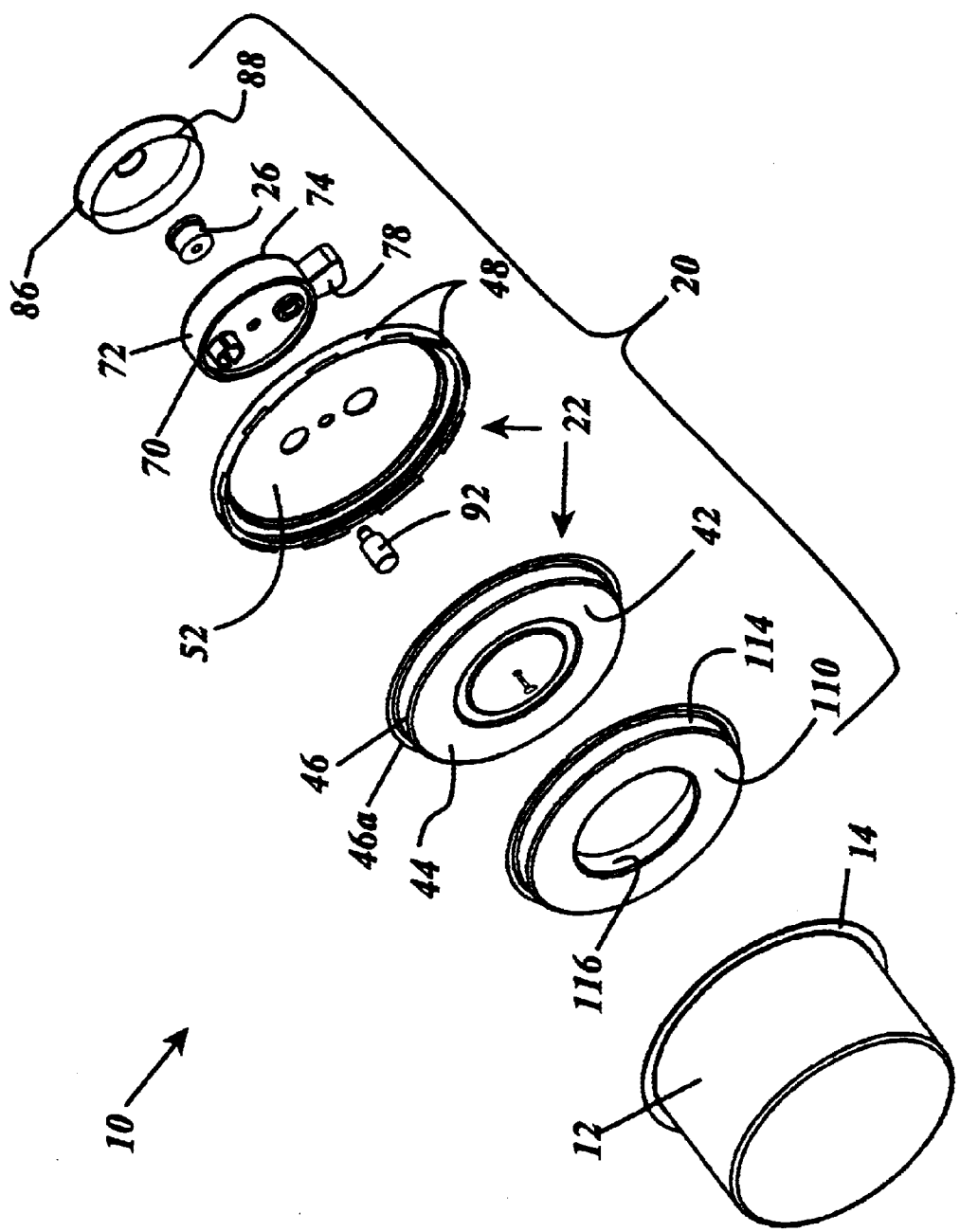
FIG. 3 is an exploded, lower perspective view of the apparatus of FIG. 1.
Figure 4:
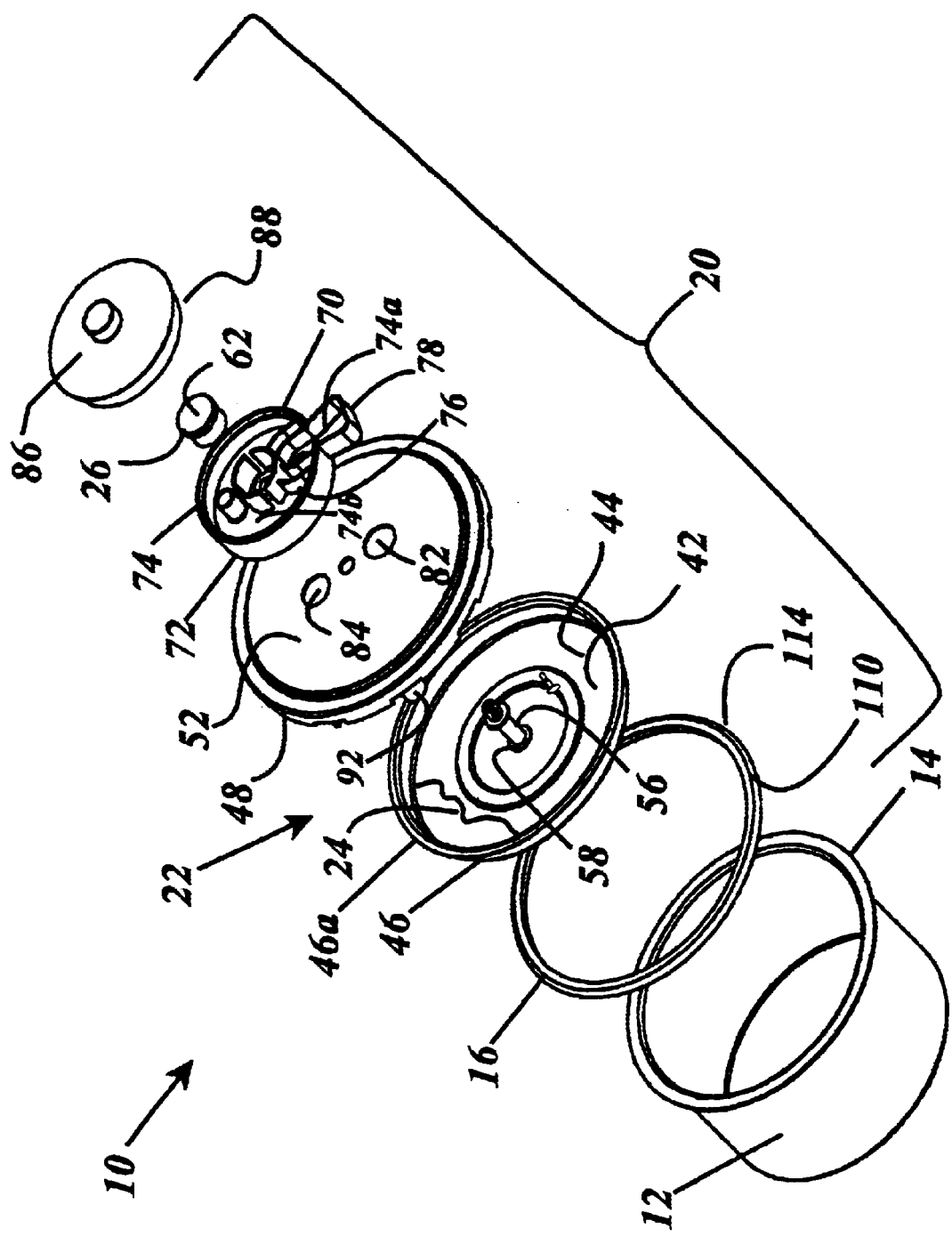
FIG. 4 is an exploded, lower perspective view of the apparatus of FIG. 1.
Figure 5:
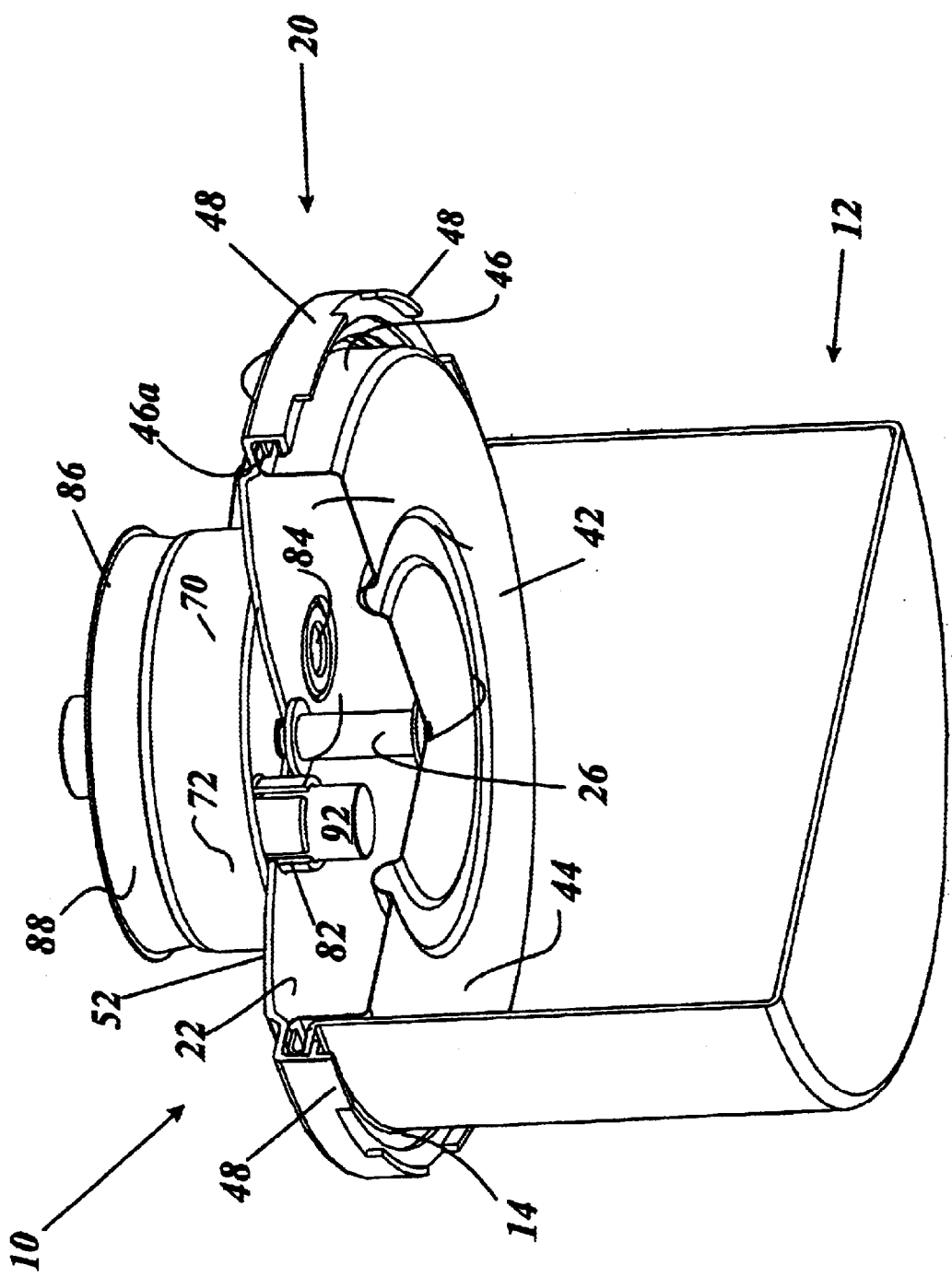
FIG. 5 is a cut-away, lower perspective side view of the apparatus of FIG. 1.
Figure 6:
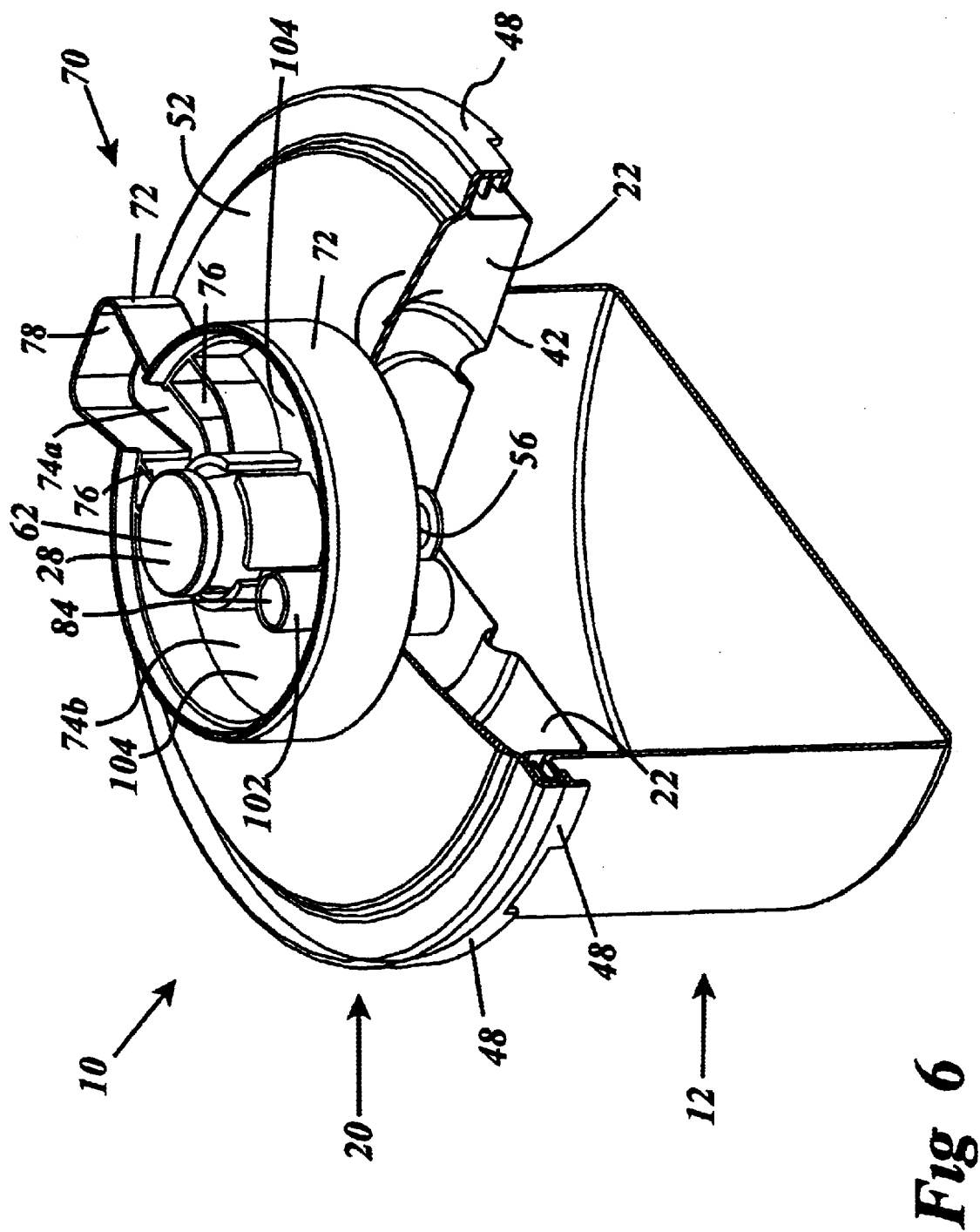
FIG. 6 is a cut-away, upper perspective side view of the apparatus of FIG. 1 with the cover omitted.
Figure 7:
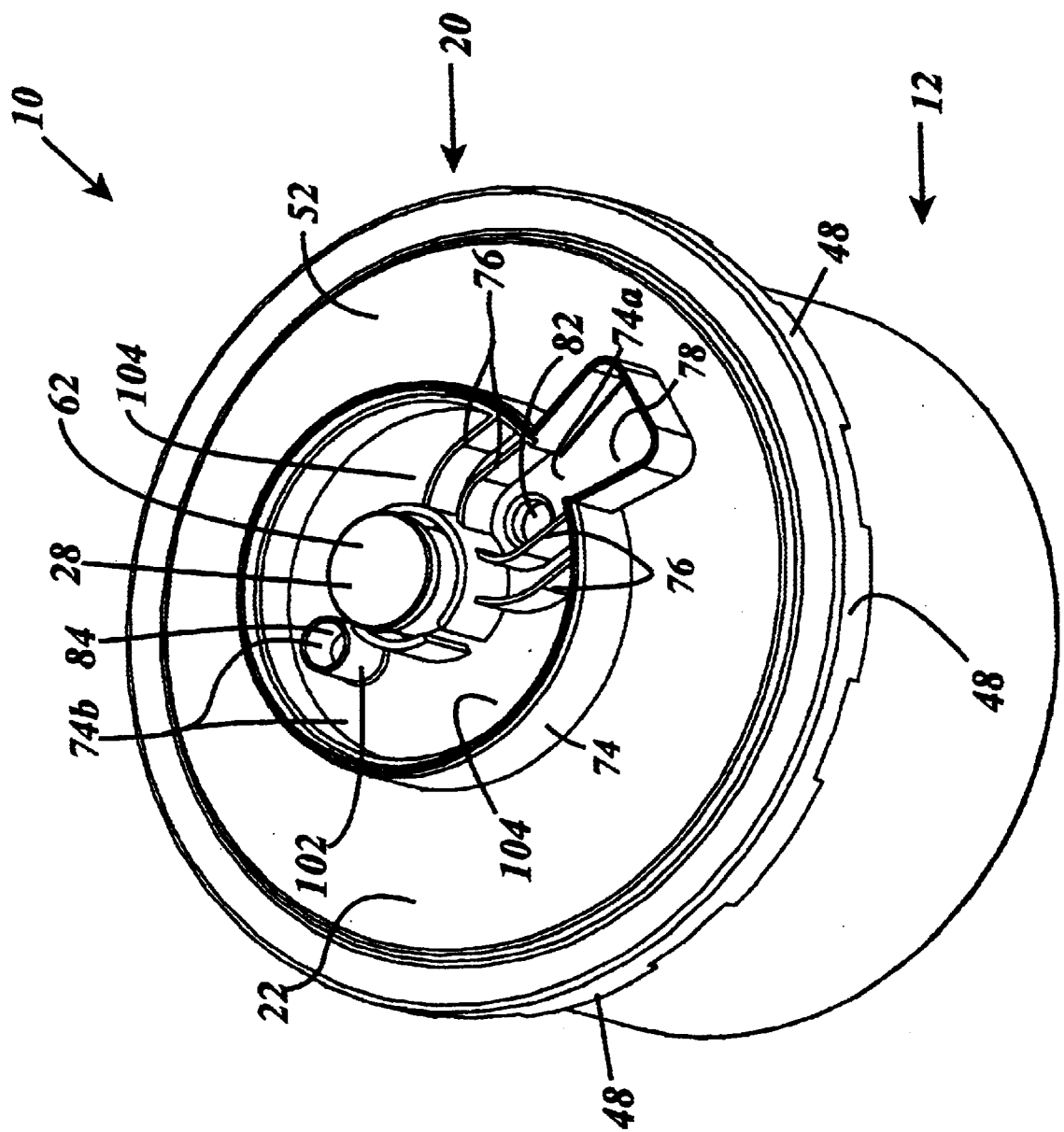
FIG. 7 is an upper perspective view of the apparatus of FIG. 1 with the cover omitted.
Figure 8:
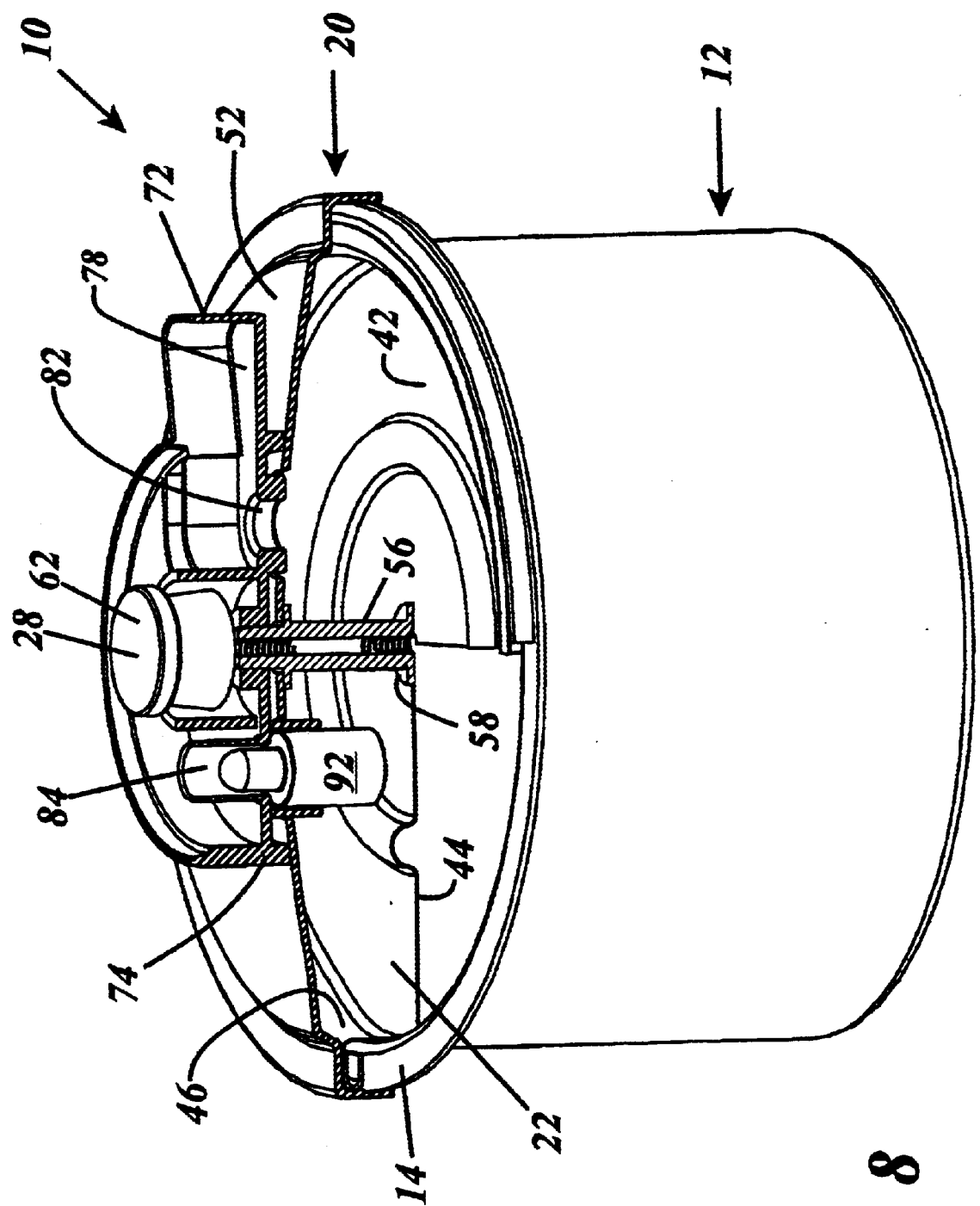
FIG. 8 is a perspective view of the apparatus of FIG. 1 with half of the lid assembly cut-away.
Figure 9:
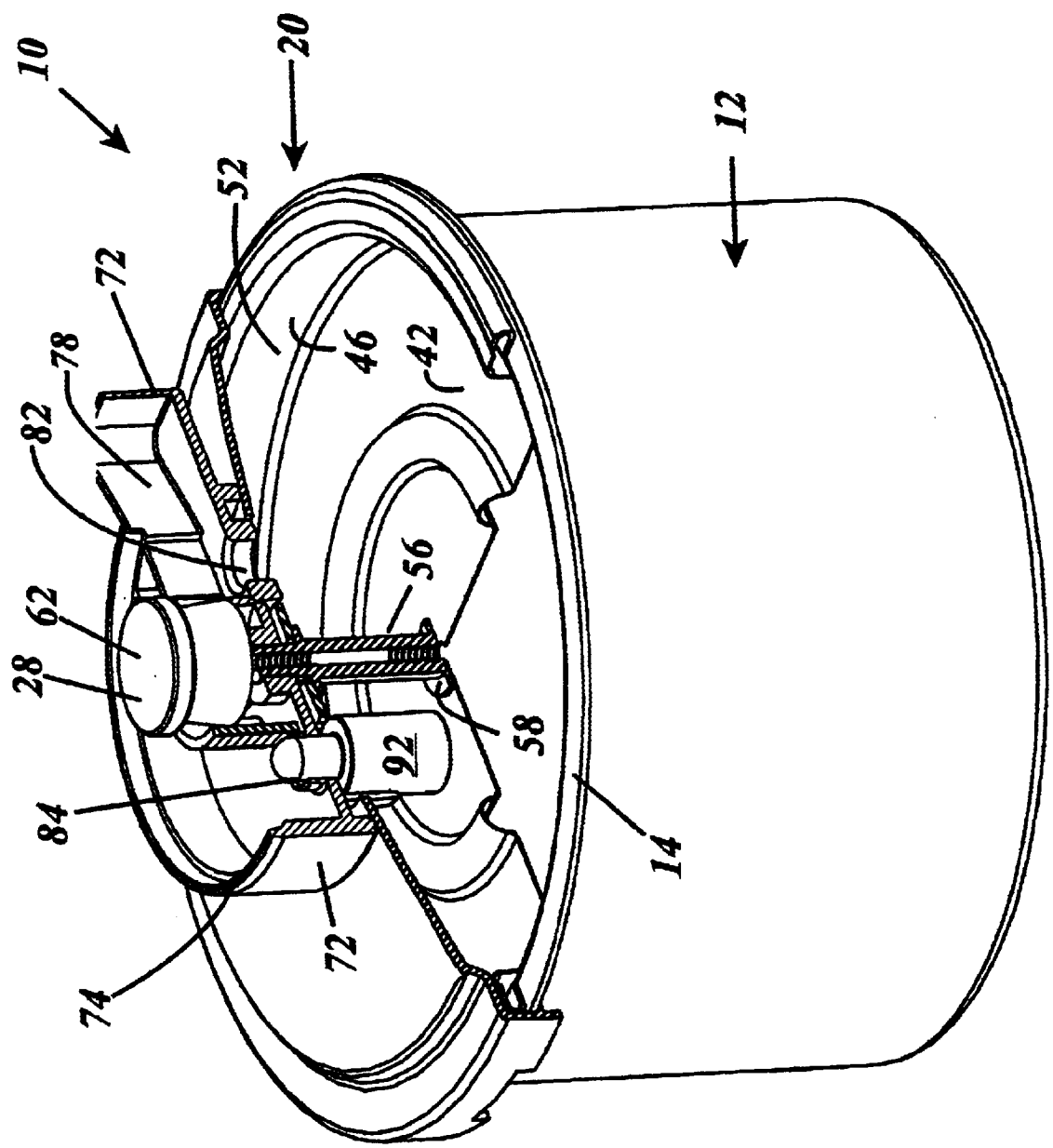
FIG. 9 is a variation of the view of FIG. 8.
Figure 10:
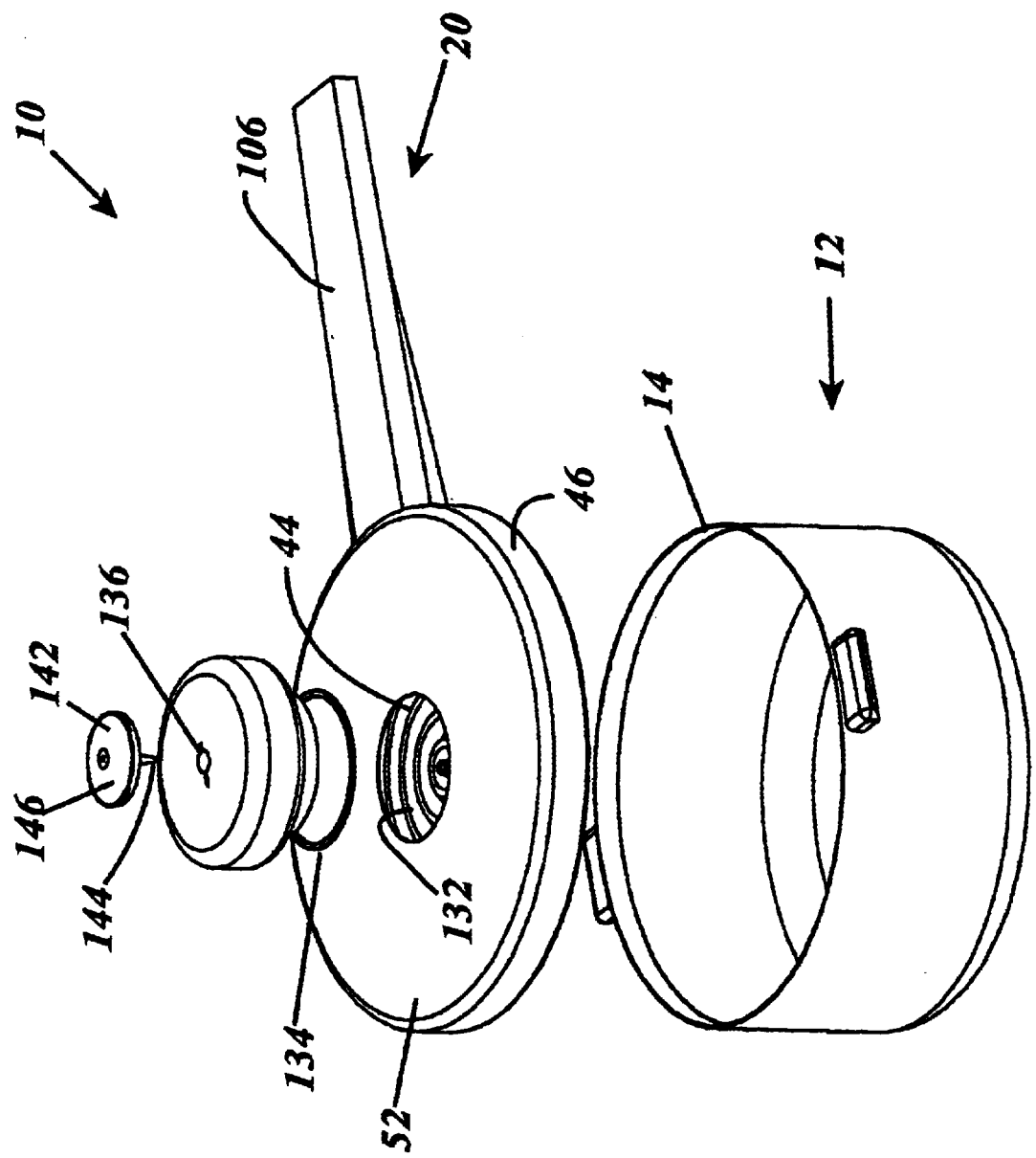
FIG. 10 is an exploded, perspective view of the cooking pot apparatus of the second embodiment.
Figure 11:
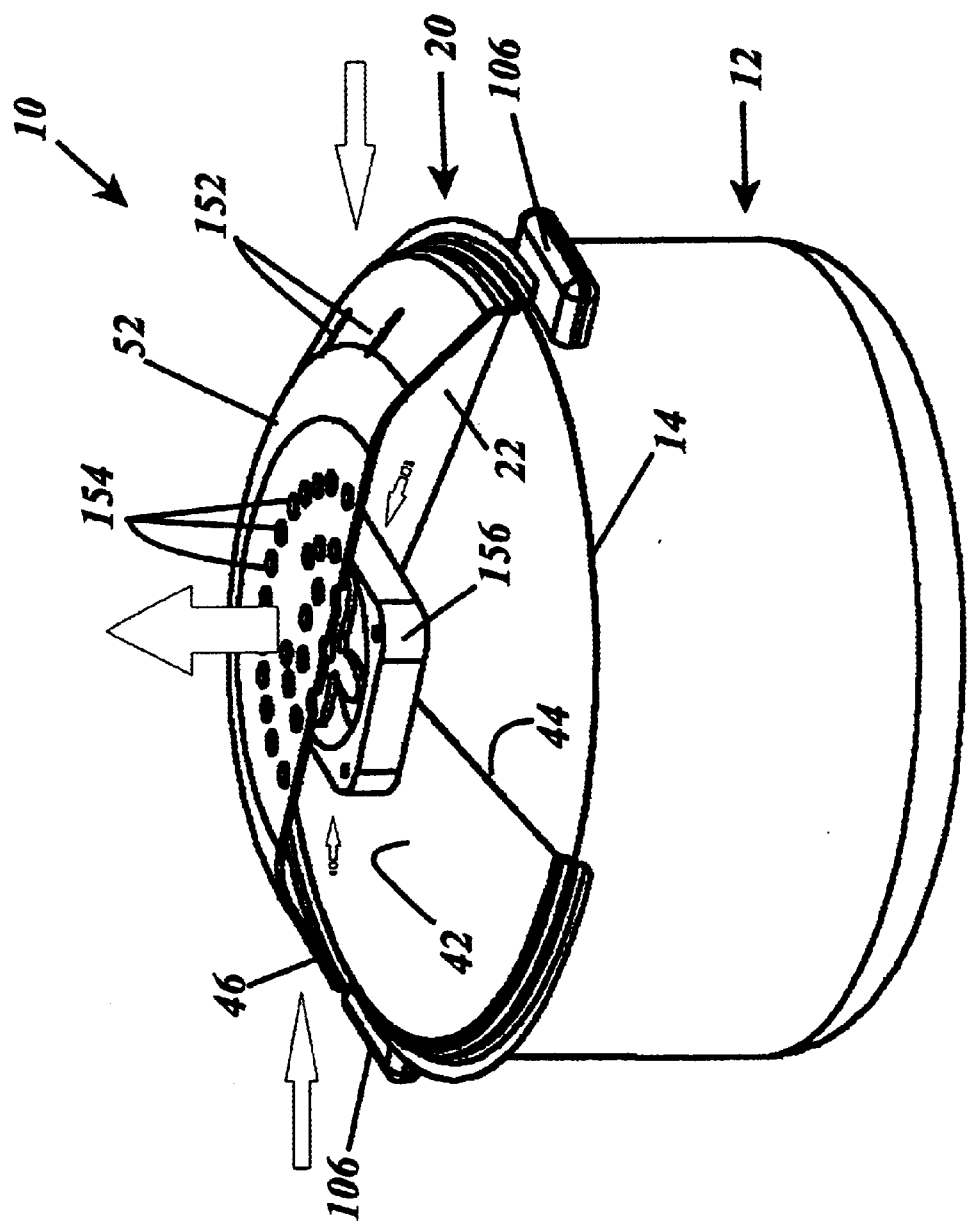
FIG. 11 is an upper perspective view of the cooking pot apparatus of the third embodiment, with half of the lid assembly cut away to reveal the air circulating fan.
Figure 12:
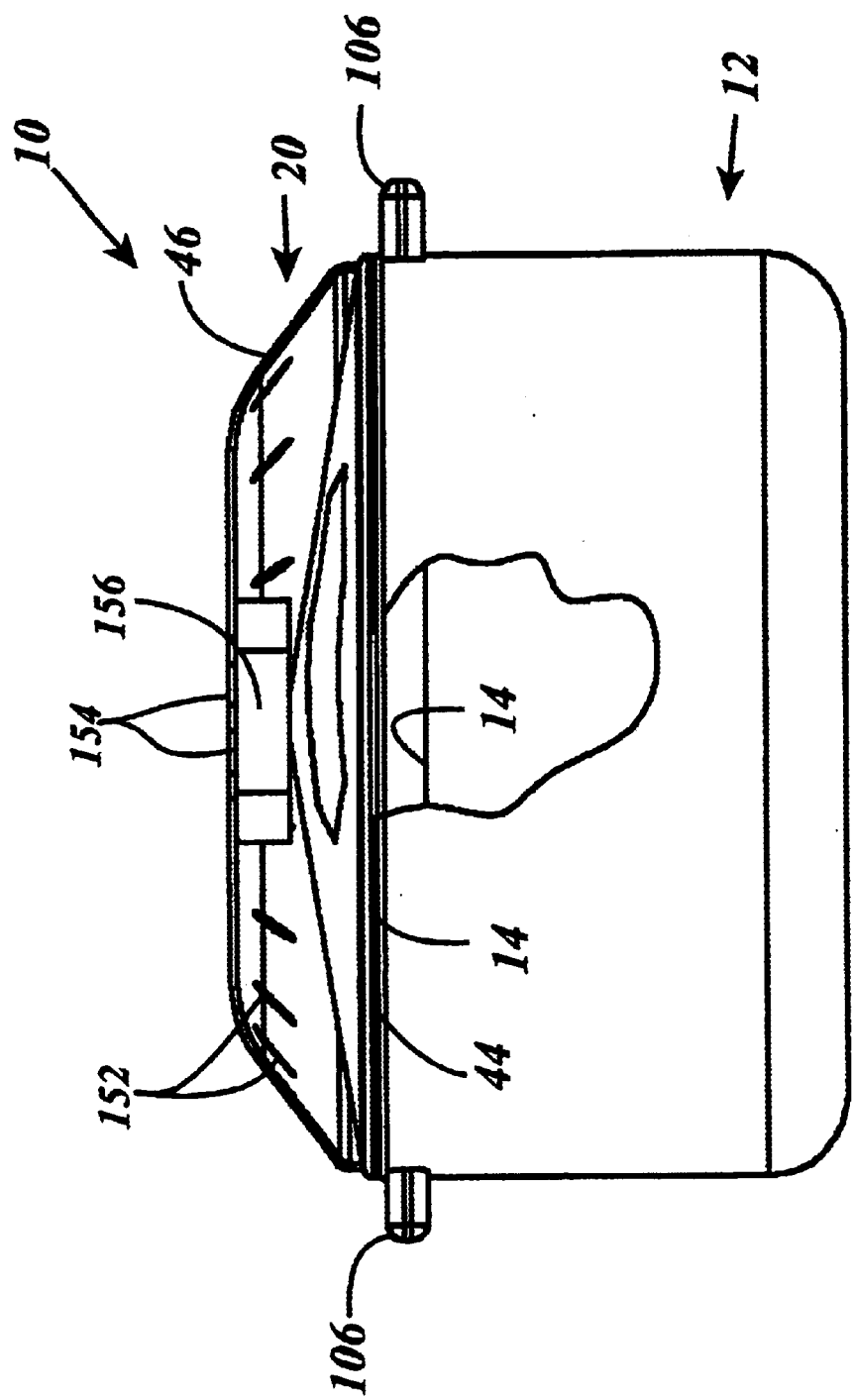
FIG. 12 is a side view of the cooking pot apparatus of the third embodiment, with half of the lid assembly cut away to reveal the air circulating fan and a portion of the cooking pot side wall cut away.
Figure 13:
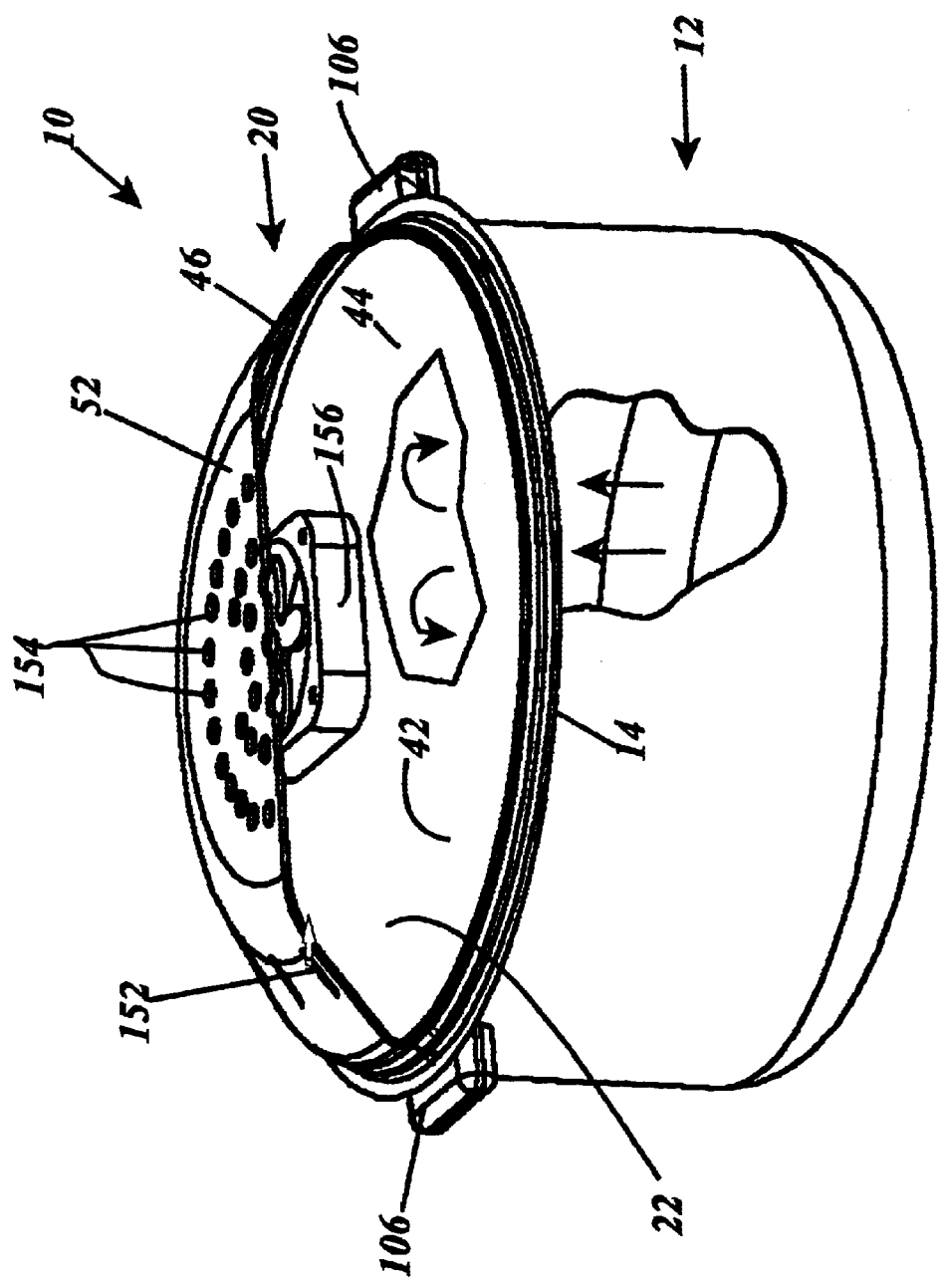
FIG. 13 is an upper perspective view of the apparatus otherwise as shown in FIG. 12.
Figure 14:
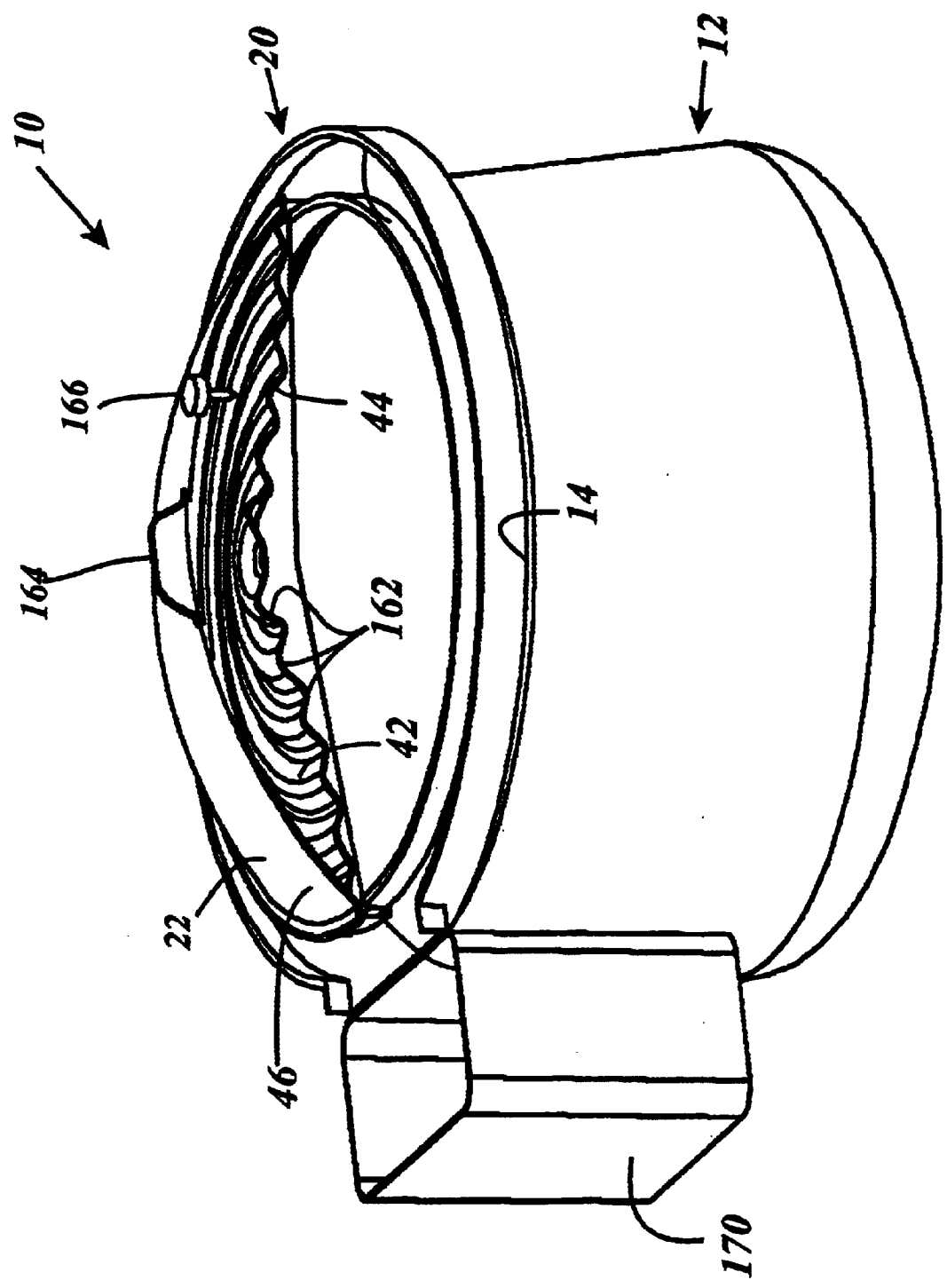
FIG. 14 is an upper perspective view of the cooking pot apparatus of the fourth embodiment with half of the lid assembly cut away.
Figure 15:
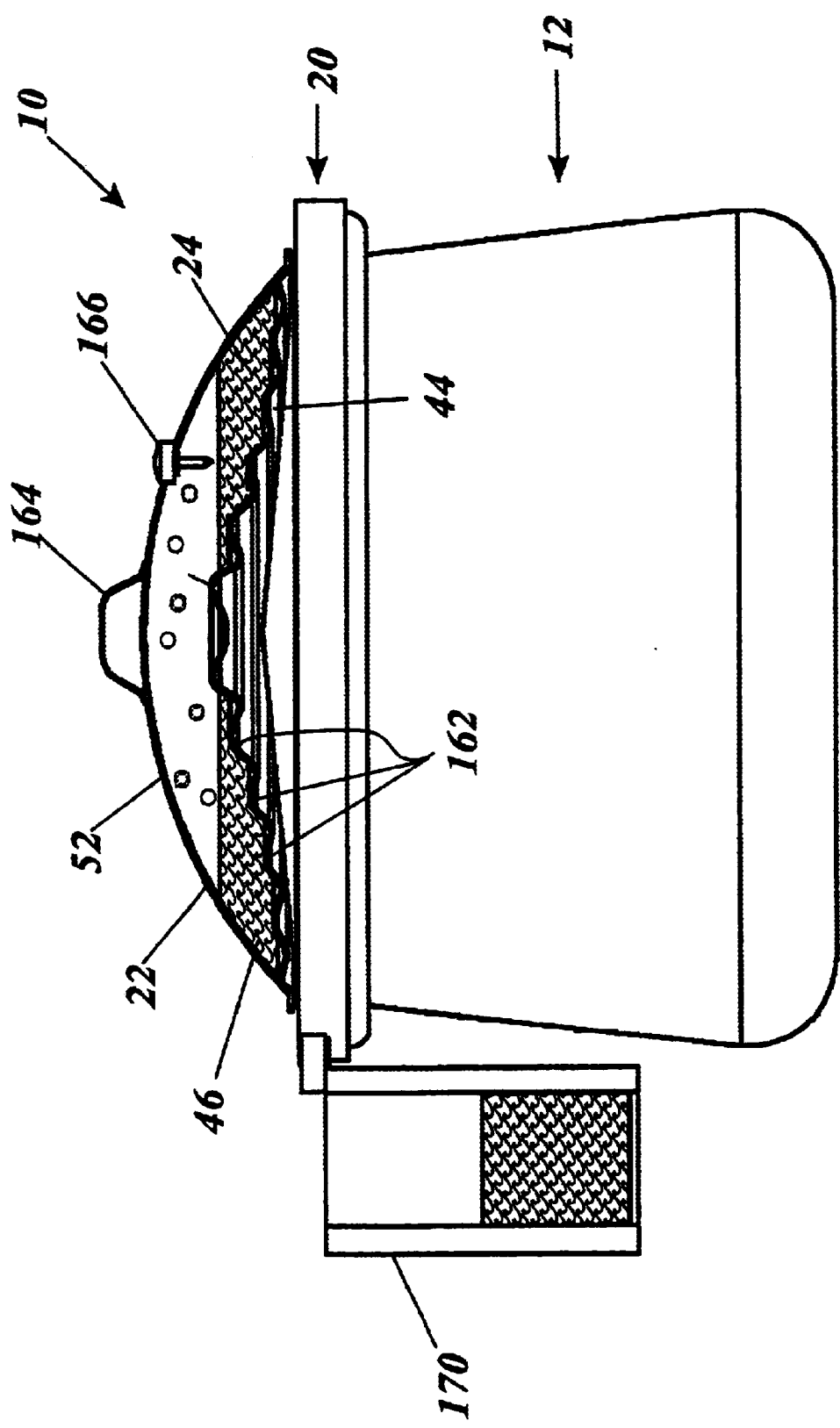
FIG. 15 is a side view of the cooking pot apparatus otherwise as shown in FIG. 14.
Figure 16:
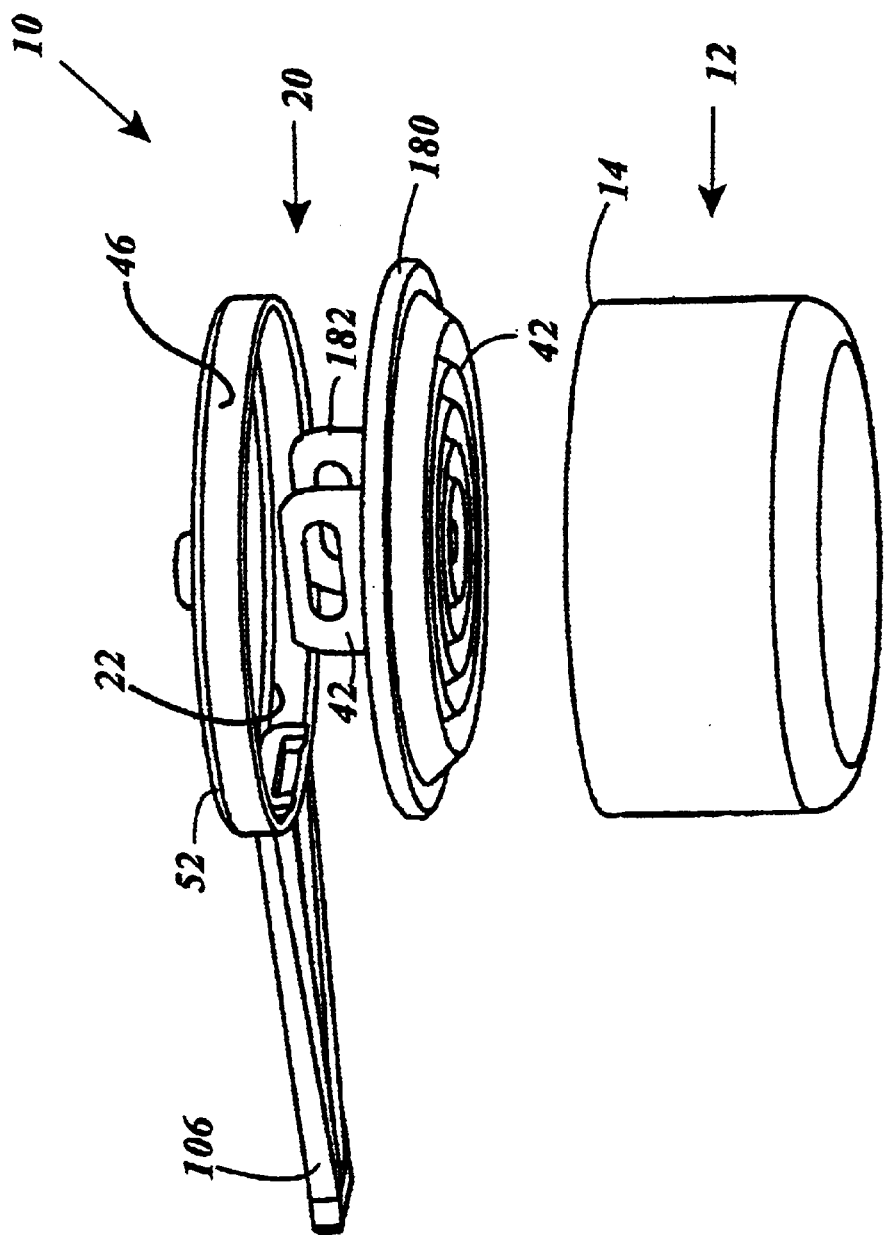
FIG. 16 is an exploded, lower perspective view of the cooking pot apparatus of the fifth embodiment, revealing the metal can version of the coolant package.

The elements of this embodiment of apparatus 10 are illustrated in FIG. 3 in exploded form. Shown in their order of interconnection are the cooking pot 12, a pot sealing annular gasket 16, the integral closure wall 42, compartment side wall 46 and venting tube 56, the compartment top wall 52, the coolant guide structure 70, the valve cap 62 and the coolant retaining tray cover 86 with a protruding cover center region functioning as a user gripping knob 88.

Lid assembly 20 optionally includes a condensate collection tray 110 having an annular collection tray bottom wall 112, an outer collection tray side wall 114, an inner collection tray side wall 116 and a tubular hub connection structure 120 attaching the collection tray 110 to the lower surface of closure wall 42. Collection tray 110 collects food and water condensate forming on and dripping from the lower surface of closure wall 42.

Second Preferred Embodiment

For this embodiment, the compartment 22 is closed. Compartment top wall 52 has a valve port 132 at its center into which is fitted a compartment safety valve assembly 130 sealed to top wall 52 with a valve assembly sealing ring 134 and having a vertical pressure release passageway 136. See FIGS. 10, 11 and 12. The pressure release passageway 136 is releasably closed at its upper end by closure valve weight cap 142 including a beveled stem portion 144 which fits sealingly downward into passageway 136 and an upper knob portion 146.

Third Preferred Embodiment

For this embodiment, compartment 22 is open. Compartment 20 contains only air as a coolant and compartment top wall 52 includes air intake ports 152, preferably located along the periphery of top wall 52, and includes air release ports 154, preferably located at the center area of top wall 52. See FIG. 13. A fan assembly 156 is mounted to the lower surface of top wall 52 underneath air release ports 154 for drawing air into compartment 20 through air intake ports 152 and for driving air out of compartment 20 through air release ports 154 in a continuous cycle. Air entering compartment 20 absorbs heat and carries the heat with it as it exits compartment 20.

Fourth Preferred Embodiment

For this embodiment, compartment 20 is closed and contains a liquid coolant 24 and a vacuum in the area of compartment 20 above coolant 24. See FIGS. 14 and 15. The vacuum is provided during apparatus 10 manufacture. In this instance, the boiling point of the coolant 24 liquid is lowered, while in the other disclosed embodiments the boiling point is either unaltered or raised.

Closure wall 42 rises progressively toward its center in a series of annular steps 162, and compartment top wall 52 follows a progressive concave curvature upward toward its center, for enhanced compartment strength against collapse from ambient pressure when not in use and against outward deformation when the coolant 24 is heated and exerts pressure above ambient. A central knob portion 164 preferably protrudes upwardly from the center of compartment top wall 52. A vacuum valve 166 preferably is provided in top wall 52. A condensate collector 170 preferably is secured along the lateral peripheral edge of lid assembly 20 in the form of an upright cup for collecting condensate running off the exterior of top wall 52.

Fifth Preferred Embodiment

The fifth embodiment includes an open coolant compartment 22 which receives a sealed coolant package 180. A quantity of pre-cooled coolant, preferably in the form of a coolant package 180 containing a liquid coolant 24, is placed in the user refrigerator/freezer and cooled prior to use in apparatus 10. See FIG. 16. Then, when apparatus 10 is to be used, compartment top wall 52 is opened and one of the coolant packages 180 is placed into compartment 20 and top wall 52 is closed and locked to compartment side wall 46. The pre-cooling of coolant package 180 increases the coolant 24 capacity to absorb heat and thus causes the coolant 24 to function more efficiently. The coolant package 180 preferably is a flexible plastic envelope or metal can with package handles 182 filled with coolant 24 during manufacture and sealed prior to sale to the consumer, although it is contemplated that envelopes may be provided with sealable openings for the user to fill with tap water or some other coolant 24.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A cooking pot apparatus, comprising:
   a cooking pot having a pot rim and a pot lid assembly for rapidly dissipating heat within said cooking pot, said pot lid assembly being sealingly and lockingly secured to said pot rim and extending across said pot rim, said pot lid assembly comprising a coolant compartment extending across said pot rim for retaining a quantity of heat absorbing coolant, said heat absorbing coolant having a boiling point lower than the temperature of the superheated cooking vapors within said cooking pot, and said heat absorbing coolant, absorbing heat from the super heated vapors for maintaining a substantially constant pressure within said cooking pot, said cooking pot being isolated from said coolant compartment;

wherein said lid assembly additionally comprises a pot safety valve assembly having a safety valve assembly opening pressure higher than the substantially constant pressure in said cooking pot, wherein said substantially constant pressure is maintained by the heat absorption of the coolant from the superheated cooking vapors;

said compartment has a top wall with a top wall upper surface and wherein said top wall comprises a coolant guide structure affixed to said top wall upper surface for guiding liquid coolant into said coolant compartment and guiding vaporized coolant out of said compartments:

said coolant guide structure comprising a guide side wall forming a laterally closed coolant retaining tray encompassing said pot safety valve assembly, said coolant retaining tray being divided into a coolant receiving region and a coolant discharge region by a tray partition wall;

and a coolant entry port in said compartment top wall within said coolant receiving region and a coolant exit port in said compartment top wall within said coolant discharge region.

2. The cooking pot apparatus of claim 1, wherein said lid assembly comprises:

a closure wall for fitting across said pot rim and closing said pot, said closure wall having closure wall sealing means for creating the seal between said closure wall and said pot rim, and having releasible rim locking means for locking said closure wall to said pot rim.

3. The cooking pot apparatus of claim 1, wherein at least a portion of said closure wall is a coolant compartment bottom wall, and wherein said coolant compartment comprises said compartment bottom wall, a circumferential compartment side wall having a compartment side wall upper end and being sealingly joined to and extending upwardly from said compartment bottom wall, and said compartment top wall is spaced above said compartment bottom wall and joined to and extending across said compartment side wall.

4. The cooking pot apparatus of claim 3, wherein said coolant compartment top wall makes sealing contact with said compartment side wall, such that said compartment is sealed.

5. The cooking pot apparatus of claim 3, wherein said coolant compartment top wall has at least one opening placing the interior of said coolant compartment in fluid communication with the atmosphere surrounding said coolant compartment.

6. The cooking pot apparatus of claim 1, wherein said pot safety valve assembly comprises:

a substantially upright venting tube having a tube lower end opening through said closure wall and extending through said coolant compartment and having a tube upper end opening through and extending above said compartment top wall;

a weighted valve cap resting and cooling on said pot venting tube upper end.

7. The cooking pot apparatus of claim 1, additionally comprising a retaining tray cover removably fitted over said coolant retaining tray and wherein the segment of said guide side wall extending around said coolant receiving region comprises:

an outward radial jog forming a coolant receiving channel protruding laterally beyond said retaining tray cover such that liquid coolant can be poured into said coolant receiving region without removing said tray cover, said coolant receiving channel opening into and being in fluid communication with the remainder of said coolant receiving region.

8. The cooking pot apparatus of claim 1 additionally comprising a floating indicator buoy slidably fitted within said coolant entry port, and having a buoy marked side surface indicating the elevation of said indicator buoy is relative to said coolant entry port as said indicator buoy floats in coolant within said compartment, such that a user can see whether more coolant is required within said coolant compartment.

9. The cooking pot apparatus of claim 7, additionally comprising a coolant escape tube encircling said coolant exit port and extending above said compartment wall to a point spaced below said retaining tray cover, said coolant escape tube containing any splashes of liquid coolant within said compartment such that splashing coolant falls back into said compartment, and permitting only vaporized coolant to pass out of said compartment into said coolant guide structure.

10. The cooking pot apparatus of claim 1, additionally comprising a pot lid handle secured to said lid assembly.

11. The cooking pot apparatus of claim 9, wherein areas of said coolant discharge region surrounding said coolant escape tube comprise aroma retaining areas for retaining aroma crystals to be vaporized and carried into the atmosphere surrounding said apparatus by vaporized coolant.

12. The cooking pot apparatus of claim 1, wherein said lid assembly comprises a condensate collection tray having a collection tray bottom wall, an outer collection tray side wall, connection structure attaching said collection tray to the lower surface of said closure wall, for collecting food and water condensate forming on and dripping from the lower surface of said closure wall.

13. The cooking pot apparatus of claim 3, wherein said compartment top wall comprises a valve port into which is fitted a compartment safety valve assembly sealed to said compartment top wall with a valve assembly sealing means and having a substantially upright pressure release passage way, said pressure release passageway being releasibly closed at its upper end by a closure valve weight cap fitting sealingly over said passageway.

14. A cooking pot apparatus, comprising:

a cooking pot having a pot rim and a pot lid assembly for rapidly dissipating heat within said cooking pot, said pot lid assembly being sealingly and lockingly secured to said pot rim and extending across said pot rim, said pot lid assembly comprising a coolant compartment extending across said pot rim for retaining a quantity of heat absorbing coolant, said heat absorbing coolant having a boiling point lower than the temperature of the superheated cooking vapors within said cooking pot, and said heat absorbing coolant, absorbing heat from the super heated vapors for maintaining a substantially constant pressure within said cooking pot;

wherein at least a portion of said closure wall is a coolant compartment bottom wall, and wherein said coolant compartment comprises said compartment bottom wall, a circumferential compartment side wall having a compartment side wall upper end and being sealingly joined to and extending upwardly from said compartment bottom wall, and a compartment top wall spaced above said compartment bottom wall and joined to and extending across said compartment side wall; and wherein said coolant compartment contains air as a coolant and wherein said compartment top wall comprises at least one air intake port and at least one air release port, and a fan assembly mounted to said compartment top wall within said coolant compartment underneath said at least one air release port for drawing air into said coolant compartment through said at least one air intake port and for driving air out of said coolant compartment through said at least one air release port, such that air entering said coolant compartment absorbs heat from said compartment bottom wall and carries the heat with it as the air exits said coolant compartment.

15. The cooking pot apparatus of claim 14, wherein said at least one air intake port is located along the periphery of said compartment, and wherein said at least one air release port is located substantially at the center area of said compartment top wall.

* * * * *